March 3, 1970  J. A. PAGE ET AL  3,498,793

METHOD AND APPARATUS FOR PRODUCING SIMULATED MEAT

Filed July 7, 1964  4 Sheets-Sheet 2

INVENTORS
JOHN A. PAGE
ROBERT C. DECHAINE

BY Harold D. Jackson

ATTORNEY

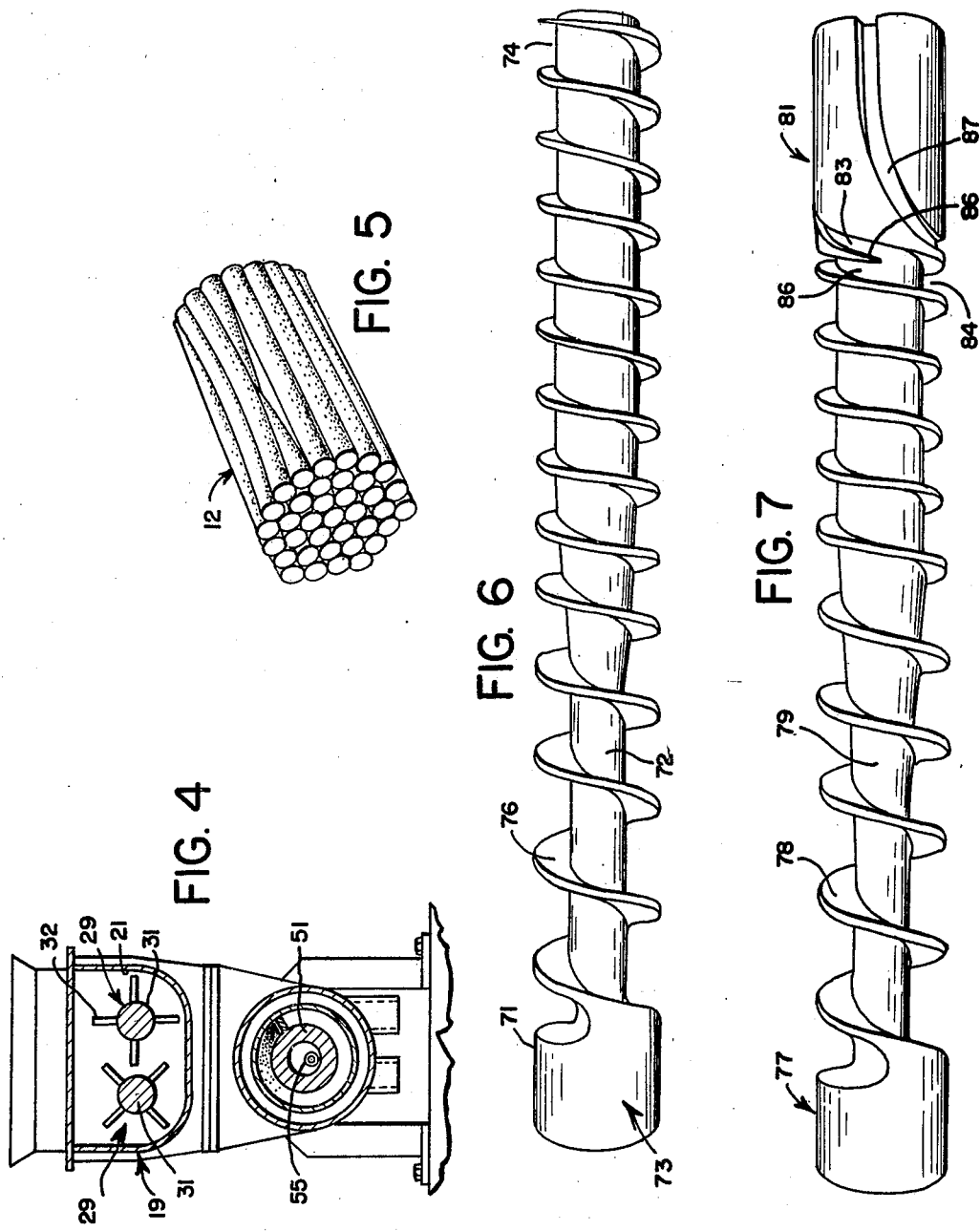

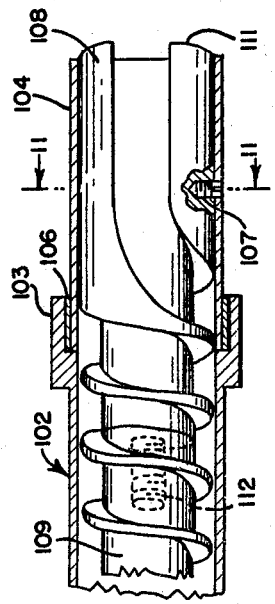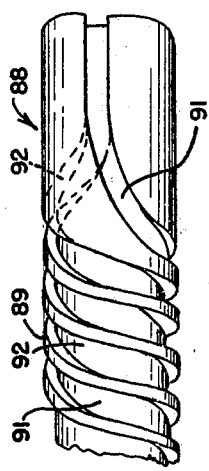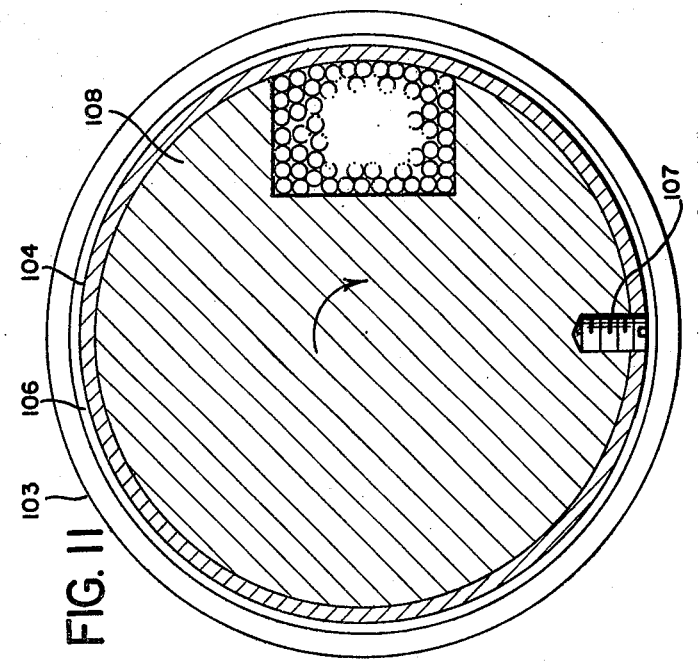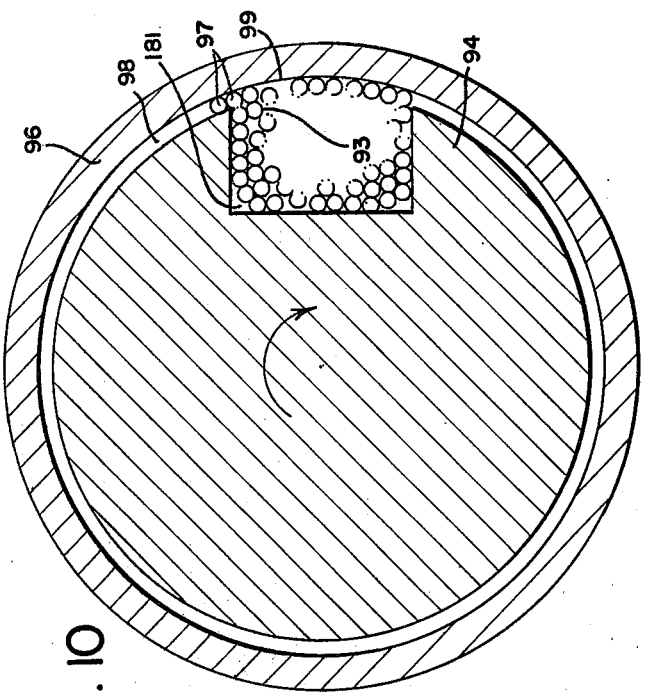

# United States Patent Office 3,498,793
Patented Mar. 3, 1970

3,498,793
METHOD AND APPARATUS FOR PRODUCING SIMULATED MEAT
John A. Page and Robert C. Dechaine, Minneapolis, Minn., assignors to General Mills, Inc., a corporation of Delaware
Filed July 7, 1964, Ser. No. 380,890
Int. Cl. A23j 1/14
U.S. Cl. 99—17   9 Claims

ABSTRACT OF THE DISCLOSURE

A process and an apparatus for preparing simulated meat products from isolated vegetable protein such as soy protein. Raw spun protein which is generally white in color and tasteless in flavor is impregnated with flavoring, coloring and nutritive substances to stimulate a particular meat product. The flavored protein is then worked and heated to simulate the texture characteristics of a meat product.

---

Figure 1:
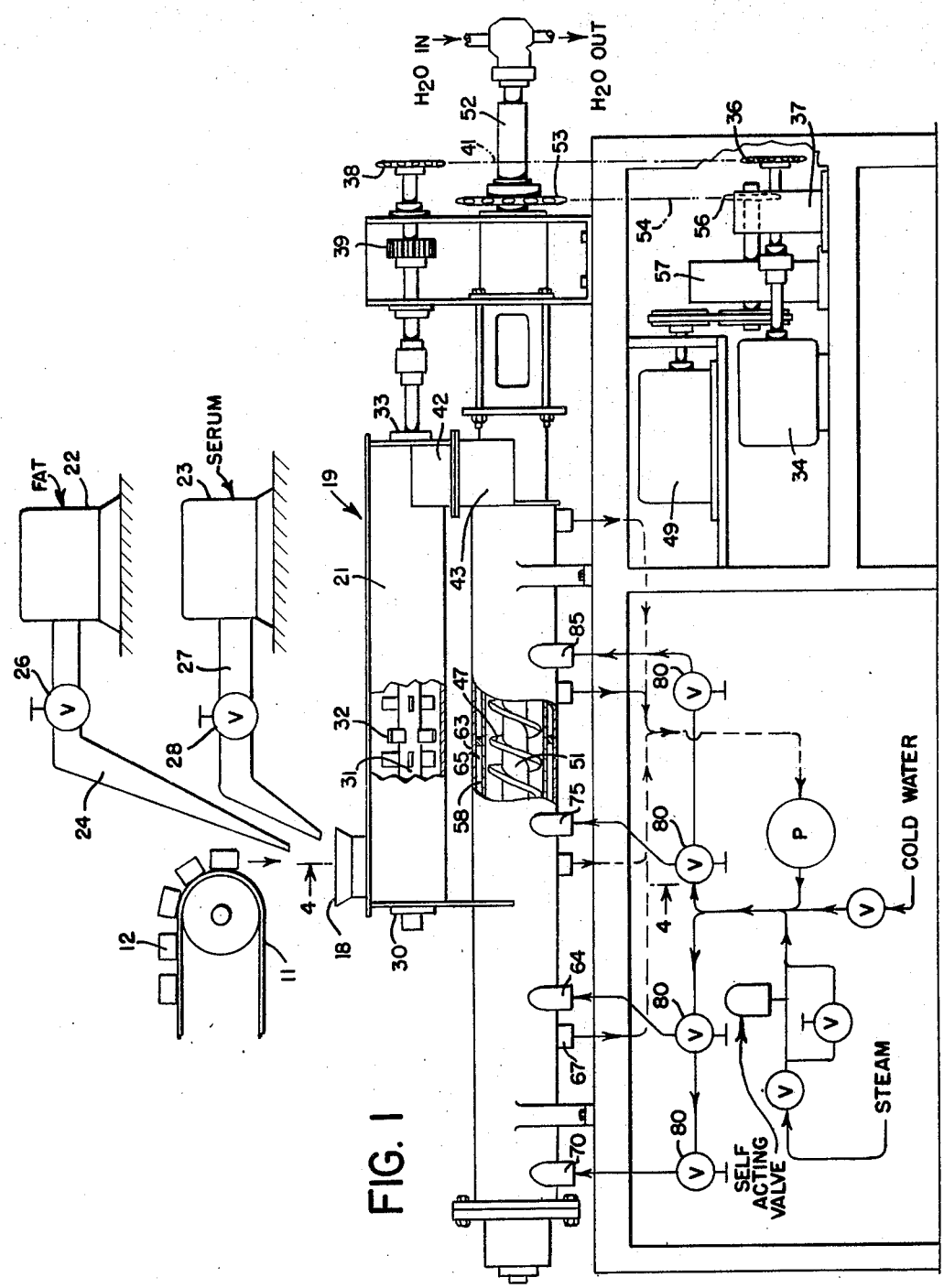

This invention relates to the art of producing food products high in protein and composed of edible protein fibers. More particularly, the invention concerns a method and apparatus for manufacturing simulated meat products having the distinct eating quality, fibrous texture and nutritional qualities of meat. The term "meat" as used in this application means not only the meat of mammals, but also the meat of fish, fowl, and shell fish as well as prepared meats such as sausage, ham and the like.

Many efforts have heretofore been made to develop satisfactory meat substitutes which possess high protein and which simulate the texture, flavor and the appearance of commercially available meat products. The prior art has disclosed, for example, the preparation of meat substitutes from edible protein materials such as soy bean, corn, or peanut protein and the like. These protein materials are produced in the form of fibers or filaments which are coagulated in a suitable bath and oriented by suitable means, such as a series of rollers operating at different speeds whereby the fibers or filaments are stretched between spaced pairs of rollers. The fibers or filaments are then placed in a salt solution (such as sodium chloride) of sufficient concentration to prevent the fibers or filaments from dissolving. Groups of these fibers or filaments may then be freed from excess liquid by squeezing or centrifuging, mixed with a suitable, edible binder, and arranged into tows. Another method of producing a fibrous product is illustrated in U.S. Patent No. 2,682,466, issued to Robert A Royer.

Although prior art processes and apparatus offer some means of producing products having fibrous textures, the products of these processes and apparatus have their limitations. The products of such prior art processes and apparatus often cannot be utilized in household recipes where baking, boiling, broiling, frying, and cooking generally are practiced, since the products cannot withstand heat and do not retain their original shape and meat-like characteristics upon cooking or heating. When served in the cooked form, such products do not present the visual appearance and texture associated with the usual meat product and accordingly, the satisfaction which one derives from mastication of the simulated meat product has heretofore been far below that expected from the usual meat product.

The prior art processes and apparatus fail in another respect and that is the completeness with which the various additives are incorporated in the fibrous protein product in order to simulate the texture, appearance, fibrous quality of meat and the taste of meat. The usual method of impregnating a fibrous tow with the various additives involves application of the additives to the continuous tow. Since the excess liquid is normally squeezed from the tow when it is formed into an edible protein fiber, the tow tends to be compact. This compactness tends to prevent complete impregnation of the fibers with the various additives. The resulting incomplete impregnation of the fibrous tow, of course, results in a simulated meat product that lacks the characteristics normally associated with a meat product.

An additional problem encountered by the prior art in the processing of edible protein fibers concerns the effective processing of the material on a continuous basis and in a device which maintains a sanitary condition over an extended period of operation. Conversion of a high protein material such as soybean material to a fibrous edible protein product involves a considerable number of steps and many and diverse types of apparatus for performing the various steps in the process. Since the product is to be an edible protein product suitable for consumption by humans, the use of any apparatus involves the problem of sanitation.

It is therefore an object of the present invention to produce a fibrous food product which simulates meat.

It is another object of the present invention to provide a method and apparatus for producing a fibrous food protein product which contains a substantial portion of protein and resembles a meat product.

Another object of the present invention is to provide a new and improved method and apparatus for impregnating a fibrous food protein product with additives to substantially simulate the characteristics of a meat product.

A more specific object of the present invention is to provide a new and improved method and apparatus for treating a fibrous food product of soy protein with additives to substantially simulate the texture, appearance, taste, smell, fibrous quality, and other characteristics of a meat product.

A further object of the present invention is to provide a new and improved method and apparatus for treating a fibrous protein product by orienting the fiber alignment to simulate the fiber alignment of meat and thereby enhance the eating quality of the fibrous protein product.

Another object of the present invention is to provide a new and improved method and apparatus for treating a fibrous protein product by compressing and compacting the fibers to simulate the texture of meat.

A further object of the present invention is to provide a new and improved apparatus of sanitary design which can be operated on a continuous basis for treating fibrous protein products with additives to produce a meat-like product.

Another object of the present invention is to provide a new and improved apparatus of sanitary design which can be operated on a continuous basis for treating fibrous protein products by impregnating the fibrous products with additives and compressing the resulting combination of product and additives in order to remove excess air from the fibrous product and substantially simulate the fiber characteristics of meat.

A further object of the present invention is to provide a new and improved method and apparatus for treating a fibrous protein product with additives, heat, and mechanical compression to simulate a meat product.

With these and other objects in view, the present invention contemplates mixing an additive with a fibrous protein product made, for instance, from soy protein. The additive may be made up of a number of components such as flavoring material, a binder, coloring agents, fat, and similar materals which can be used to substantially duplicate the flavor of a meat product. The combined additive and fibrous product is then heated, worked, and compressed in order to orient the fibers of the product to simulate the fibrous characteristics of meat. The product is compressed and heated in order to duplicate the texture and other characteristics of meat while at the same time setting the binder in the product if a heat setting binder is utilized.

The invention contemplates a novel apparatus, which may include a mixer for combining a fibrous protein product with any additive and intimately intermixing the materials. The mixed materials are then discharged from the mixer into an auger where the material is heated to set a binder which is part of the additive and in which the fibers of the fibrous protein product are oriented in order to simulate the fiber orientation of the meat product. The auger is designed so that the product is compressed to remove air and to compact the fibrous product prior to discharge. At the discharge end of the auger an auger attachment may be provided for controlling the discharge of the fibers in order to facilitate cutting or further processing of the processed product. A heating jacket is utilized in connection with the auger wall in order to heat the combined materials and set the binder.

A complete understanding of the invention may be obtained from the following detailed description of an apparatus forming specific embodiments when read in conjunction with the drawings, in which:

FIGURE 1 is a front view of an apparatus according to the present invention showing a mixer and an auger in partial cross section in relation to other elements of the apparatus.

Figure 2:
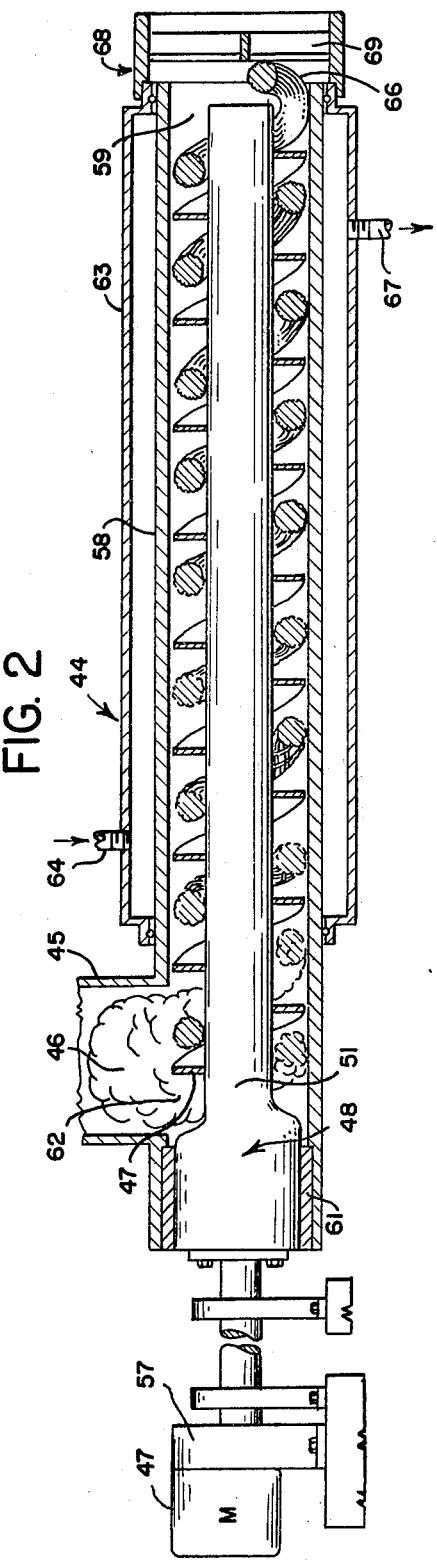
Figure 3:
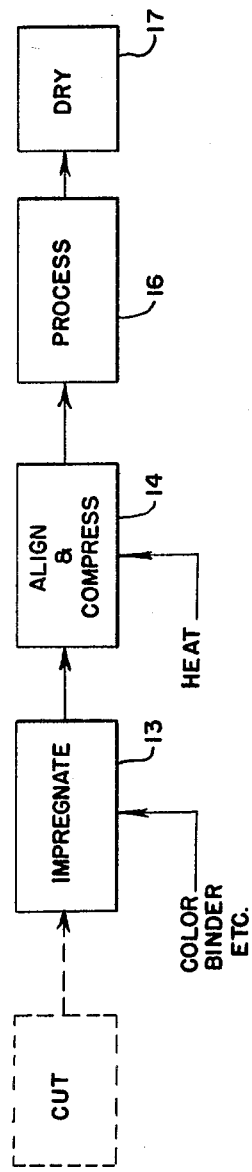

FIGURE 2 is a cross section view of the auger shown in FIGURE 1 and showing the fibrous protein products in the auger, FIGURE 3 is a block diagram illustrating the process involved in the present invention, FIGURE 4 is a cross section view taken along lines 4—4 of FIGURE 1, FIGURE 5 is an isometric view of a segment of the fibrous protein product prior to processing in the present invention, FIGURE 6 is an alternate embodiment of an auger which might be utilized in the apparatus shown in FIGURE 1 and FIGURE 2, FIGURE 7 is an alternate embodiment of an auger which might be used in the apparatus in FIGURE 1 and FIGURE 2, FIGURE 8 is an end view of a section which might be attached to the auger illustrated in FIGURES 2, 6, and 7, FIGURE 9 is a segmented view partially in cross section of an alternate embodiment of FIGURE 8 which may be attached to the end of the auger assembly as illustrated in FIGURE 2, FIGURE 10 is an illustration of a problem which exists in the handling of fibrous protein material, and FIGURE 11 is a cross section view taken along lines 11—11 of FIGURE 9.

The spun protein products can be produced by any number of methods known in the art. A wide variety of protein materials which are edible can be used in preparing the product. Representative of such materals are soybean, corn, peanuts, and pea proteins, as well as various animal proteins such as casein. The edible proteins spun into fibrous form may be prepared, for example, by first dispersing dry or water slurried protein in an alkaline medium. The amount of protein dispersed may range from about 10 to 30% by weight. A suitable alkaline medium is water containing an alkali metal hydroxide, that is about 5 to 10% by weight sodium hydroxide. The pH of the spinning solution can be varied to within relatively wide limits but may generally be in the range of 9 to 13.5. The viscosity and temperature of such dispersions is generally within the range of about 10,000 to 20,000 centipoises and about 25 to 45° C., respectively. Viscosity, pH, temperature, and concentrations of alkaline metal hydroxide and protein will vary somewhat with the particular protein being dispersed. Also, dispersion may amount to a colloidal solution.

The spinning dispersion or dope is forced through a porous membrane such as a spinneret used in the production of rayon, and into a coagulating bath which is generally an acid and salt solution. The streamlets coming from the spinnerets are precipitated in the form of filaments or fibers having a diameter of about .003 to about .004 inch. Alternatively, coarser filaments or fibers can be produced by starting with the proteins in the form of powdered material and plasticizing them with about 25% alkyline water and then extruding the plasticized protein material through dies. The filaments or fibers produced by such a process have a much greater thickness and resemble paint brush bristles.

The coagulation step in protein fiber production is also carried out in a bath containing from five to 15% by weight sodium chloride and acids at a concentration of about 0.5 to about 10% by weight. Acids such as acetic, nitric, citric, phosphoric, hydrochloric, and sulfuric can be used.

Individually spun filaments from the various spinnerettes are brought together in bundles or tows and stretched by pulling them from the coagulating bath over take up rolls. A variety of methods may be used to stretch the fibers composing the various tows. The stretching process alters textural characteristics by changing the diameter and strength of the individual fibers.

pH of the tows of fibers leaving the coagulating bath ranges from about 1 to about 4. This factor together with the relatively high concentration of sodium chloride present in the fiber tow yields a generally undesirably sour and saline product. Thus, the fibers are further processed to remove excessive acid and salt solution. Properly neutralized and washed fiber will have a pH in the range of about 4 to about 7 and a negligible sodium chloride content. Fiber tow so processed may be converted from a rather tasteless bundle of high protein food to a product which resembles one of a variety of meat products. A particular meat product is produced by impregnating the protein fibers with additives containing binders, flavors, coloring material and texture modifying constituents such as fat.

In the present process, the fibrous tow is first severed across its longitudinal axis into segments 12 such as that illustrated on the conveyor 11 of FIGURE 1 in the drawing. The tow may be severed by conventional means and segments 12 deposited on the conveyor 11. The tow is cut into segments 12 in order that the segments may be processed to thoroughly impregnate the individual bundles of fibers with an additive which contains the individual constituents which provide the color, taste, smell and other characteristics of a meat product. Segments 12 can be processed in such a fashion that the individual fibers will separate so that the additive can be effectively added to each segment 12 to obtain a uniform and thorough distribution of the constituents of the additive throughout the segment. This thorough distribution insures a uniformity of taste, appearance, and quality. It should be understood, however, that the tow in the uncut form may also be processed provided thorough distribution of the additive throughout the fiber tow can be accomplished without the cutting of a tow into segments. However, it has been found that the segments 12 are more readily impregnated than a continuous tow of fibrous protein product.

Next the segments 12 are combined with the additive which together with the fiber segments provide the physical characteristics of a product which resembles meat. An additive is formulated which contains constituents necessary to produces a particular type of meat products. Generally speaking, the additive will include a coloring agent to provide the meat color, a binder to bind the individual filaments of the fibrous protein product, a flavoring agent which will depend upon the meat to be simulated, a fat in order to increase the fat content of the finished product to a level normally associated with the meat involved, and other ingredients which might be utilized to enhance the stability of a product.

Binders are added to the fibrous protein product in order to bind the individual fibers together so that the fibrous texture of the product will resemble that of meat. The unbound fibers tend to separate when they are further processed, handled or cooked. When a binder is added, the mass of fibers appear to have the connective tissue normally associated with the connective tissue of ordinary meat. The binders may be selected depending upon the particular characteristic or characteristics desired in the end product. In other words, a binder which may be used for a fish product may not be the same as that used to simulate a red meat-type product for the reasons that the red meat-type product normally is tougher and less likely to pull apart. Further, the binder may be chosen on the basis of heat irreversibility. In other words, the binder may be selected on the basis of the end use of the finished product. For example, if the meat is to be used in a casserole-type dish where subsequent heating will take place, a heat irreversible binder should be used. The heat irreversible binder will permit the finished product to be heated and yet the material will retain its characteristics. If, however, heating is not anticipated as in a simulated prepared meat product such as bologna then irreversibility of the binders is not of concern since normally such a product would be eaten in the cold or cool state. Thus it can be seen that the binder may be selected on the basis of a meat product characteristics which are being simulated and the end use of the product. Examples of irreversible heat coagulable heat binders are the various albumins such as egg albumin, fish albumin, soy albumin, and wheat albumin. Egg albumin has been found to be particularly useful due to its commercial availability at a reasonable price. Examples of other binders which might be used depending upon the application of the end product are such binders as gelatin, starches such as "Pay-Gel," the various pectins, casein, and gums such as carboxy methyl cellulose, guar and others. Undoubtedly, other binders may be found useful in various applications and the above art is given by way of example of the many which are available for use.

Another major constituent of the additive is fat. All meat-type products have a certain quantity of fat associated with the protein of the meat product. This fat occurs in various flavors, concentrations, and physical forms depending upon the type of meat considered. For example, the fat normally associated with a beef product is quite different from the lard of pork. Each of these are quite different from the fat associated with mutton and fish-type products. Accordingly, fats may be chosen and utilized in such quantities as to facilitate simulation of the meat products under consideration. Further, consideration of the end use of the product is important in the choice of the fat since the products may be aimed at a vegetarian market where animal fats are not desired. A further consideration as to the choice of fat in the meat product concerns dietary limitations. For example, a meat product may be simulated but the most desirable fat may be an unsaturated fat. Further, the simulated meat may be produced with a higher or lower fat content thus permitting a regulation of the quantity of fat introduced into a particular diet. With these goals in view, the fat used may generally be either animal fat or vegetable fat. Either can be a constitutent of the additive. A number of vegetable oils both hydrogenated and unhydrogenated have been found to be useful. Examples of these are cottonseed oil, corn oil, soybean oil, coconut oil, and similar vegetable oils. Examples of animal fats may include lard, tallow, chicken fat, butter, fish oils, and various other animal and seafood fats. Other oils such as mineral oils, olive oil and the like might also be considered. It is to be pointed out here that the above fats are listed by way of example and not in terms of limiting the scope of the invention herein.

A number of other ingredients go into making up the additive. Examples of some of these additional constituents are skim milk solids which may be used as a filler and as a binder. Sugar, starch, monosodium glutamate as a flavor enhancer, hydrolized protein as a flavoring agent, spices, onions, salt, dried egg whites, wheat gluten, garlic, white pepper, and onion powder, and other ingredients which will produce the final flavor and characteristics of the meat being simulated. The number and type of ingredients is only limited in part by the characteristics which are desired in the end product considering such things as the final use to which the product will be placed such as a chilled product or a cooked product, a dry product or a wet product, the type of meat to be simulated, the period of stability desired in the product and similar factors.

The segments 12 are next combined with the additive containing the above-described constituents. The combining may take place by simply pouring the additive together with the segment 12 into a suitable container for containing the mass. At this point the combined segments and additive are agitated in some manner in order to impregnate the fibers with the additive. Movement of the segments and stirring may be accomplished by a number of means. For instance, the segments and additive may be agitated by hand in a suitable vessel. The combined segments 12 and additive should be agitated long enough to insure impregnation of the individual segments 12 by the additive. A thorough distribution of the additive throughout the segment 12 is desired so that each fiber is contacted by the additive thus resulting in a product which has uniform flavor, taste, texture, and similar physical characteristics. This in turn will enhance the meat-like characteristics of the fibrous protein product. The agitation should be vigorous enough so that the individual fibers of the segments 12 tend to separate from each other. The fibers if agitated properly, will separate and the segment 12 will take on the appearance of a soggy, saturated ball of cotton. In this condition the segments 12 tend to be thoroughly surronded by the additive and the entire mass takes on a uniform viscosity or consistency in which the identity of the individual bundle 12 tend to be lost in the entire mass and the mass appears to be a rather viscous fluid containing fibers which have no particular alignment. This impregnation step is illustrated by block 13 in the block diagram shown in FIGURE 3 of the drawings.

At this point, the viscous mass containing the fibers and the impregnating additive does not resemble a meat product for several reasons. First the mass is in a sense viscous. Secondly, the fibers are not aligned in any fashion in a manner normally recognizable in meat. Further, the fibers do not have the compact consistency normally associated with meat. Accordingly, the viscous mass is next worked or treated in order to impart many of the physical characteristics associated with meat to the fibrous protein product. The mass containing the randomly aligned fibers is accordingly drawn out and worked so that fibers become aligned in a somewhat uniform fashion. Meat normally has a fiber alignment characteristic of the muscle involved in the meat cut. Accordingly, the mass may be layed out in a thin stream in order to achieve some degree of fiber alignment. An apparatus which might also be utilized for accomplishing the fiber alignment is illustrated in the drawings and is described hereinafter. An auger is utilized for this purpose and tends to align the fibers as the material travels from the feed end of the auger to the discharge end thereof. This augering action tends to align the fibers and simulate the fibered texture and characteristics of meat.

As illustrated in box 14 of the block diagram shown in FIGURE 3, the alignment and compression of the fibers may take place at the same time. A squeezing action is applied to the mass of viscous material so that the fibers are forced together or into contact with each other thus substantially achieving the compactness of the fiber bundle of a meat product. The compression may be accomplished in varying degrees in order to simulate the various meat products which may be reproduced. For instance, a beef-type product will normally have more compactness fiber structure than might be expected in a fish-type product. Accordingly, application of more or less pressure to the viscous fibrous mass is utilized in order to accomplish the end result desired. This compression can be accomplished by simply squeezing the fibers together by mechanical means or by hand. The requirement is that the fibers be compacted. Again an example of an apparatus which might be utilized for this purpose is illustrated in the drawings and will be described as noted.

If a binder is properly chosen, one which will coagulate and set under compressive action, the binder will coagulate and agglutinate or bind the individual fibers together in somewhat the same manner that the connective tissue in a muscle fiber bind the various fibers of a meat product together. This binding function of the binding constituent in the additive thus imparts firmness to the product. Thus with the fibers aligned in substantially the same manner as that in the meat product and with the fibers bound together by a suitable binder such as one of the types listed, the fibrous protein product takes on the consistency of a meat product. If the proper combination of ingredients is chosen, and processed in this manner, the resultant product will have a toughness and resistance to disintegration which is characteristic of meat.

In a preferred embodiment of the present process, a binder which is heat coagulable and which is heat irreversible is most desired. By irreversible is meant that upon application of heat through the finished product, the coagulated binder will not break down and thus the finished fibrous product will retain the essential characteristics of a meat product. As noted previously, this irreversible quality is desirable in a situation where the simulated meat is to be used in a heated casserole or some other baked dish. An example of a desirable heat coagulable and commercially available binder is egg albumin which contains the desired binding properties with the desired heat irreversible characteristics. If a heat coagulable binder is utilized then the material must be heated in order to coagulate the binder and accomplish the binding of the individual fibers in the mass.

It is possible to select a binder which will connect the fibers when simple compression of the product takes place. Such a binder is perfectly acceptable when the end product is a chilled-type product. If such a binder is used, no heating step is necessary in the process.

A preferred embodiment of the invention utilizes a binder selected from one of the heat coagulable binders set forth above. These binders are coagulated by heating the mass of additive and fibrous protein product to a temperature from about 125° F. to about 220° F. This heat is applied to the material during the aligning and compressing phases of the process. Thus as the product is compressed to force the individual fibers together, the binder is coagulated by the application of heat with the result that the product is compacted and solidified at the same time. A preferred binder which is commercially available and which is irreversible is egg alubmin. A temperature range of 125° F. to about 220° F. may be utilized to set the egg albumin. However, a preferred heat range of from about 145° F. to about 175° F. produces a product having somewhat more commercially marketable properties. To some extent, the range of temperature which may be applied to the material to coagulate the binder will be dependent upon the type of meat product which is to be simulated. For example, it has been found experience that when egg albumin is utilized to produce a hamburger-type product, a heat range of from about 155° F. to about 165° F. is the preferred range for setting the binder. This produces a simulated hamburger which resembles natural hamburger to a great degree. As a contrast, experience has shown that simulated ham wherein egg albumin is utilized as the binder can be produced with application of from 125° F. to about 220° F. with a preferred range between 125° F. to about 135° F. to set the binder. Seafoods and fish can be simulated by application of temperatures of about 125° F. to about 220° F. to coagulate the egg albumin. The result is a high quality simulated seafood or fish. It is noted that the temperature ranges illustrated here are used for illustration purposes to indicate the range of temperatures which are normally associated with a heat coagulable albumin binder. A variation in the particular albumin utilized or a choice of some other type of heat coagulable binder may vary the stated ranges of temperature somewhat in order to arrive at a finished product having characteristics resembling a finished meat product.

Depending upon the particular characteristics of the binder utilized, the heat or whatever coagulating agent is utilized, may be applied prior to the compression of the product as well as during the compression of the product. One of the essential results which is to be achieved is compaction of the fibrous material so that the individual fibres of the mass will be securely bound together. The binder also serves one other function and that involves the "locking" of the various ingredients or constituents of the additive in position, within the fibrous segments 12. The coagulated binder acts as an agent for locking the distributed ingredients of the additive about the fibers so that the thorough distribution of the additive achieved by the agitation remains constant after the product has been processed to a finished product. This is essential of course in order to insure uniformity of the product and a sustained high quality of the product. The binder also prevents the flavoring agents and coloring material from leaching out of the finished product.

At this point in the process, the product is an unbroken coagulated mass of simulated meat product which has the essential characteristics of a meat product. The unbroken mass may now be further processed to enhance the characteristics of the product if desired. For instance, if hamburger is desired as the finished product, a further processing step of grinding may be necessary to bring the simulated meat product to the consistency of hamburger. If a seafood, fish, or fowl type product is to be simulated, the product may be diced, cubed or sliced in order to simulate the usual characteristics of these products. If a ham product is to be simulated, slicing of the product or for that matter, cubing the product may be desirable.

Since the product described at this point is essentially a moist product, having a quantity of water trapped by the coagulated binder, a further step may be taken to make the product marketable. This step involves drying the product so that it may be packaged in ordinary packages and stored without refrigeration. The drying brings the moisture content of the product to about 2% to about 8% by weight. Preferably, the product is dried to a range of from about 4% to about 5% by weight. Thus a hamburger product may be dried so that the resulting product is granular in form. It has been found that this granular product can be stored without refrigeration and is easily rehydrated by simply heating the product in the presence of moisture. The drying illustrated by box 17 in the block diagram of FIGURE 3 may be accomplished by any number of well known methods of drying granular material or cubed material.

Most of these steps described above in connection with processing the fibrous protein product from a raw fiber to a finished simulated meat can be accomplished by readily available equipment or can be accomplished by simple hand operated means. Also, one embodiment of a novel and preferred apparatus in which the process of the invention may be accomplished is set forth in the attached drawings.

After the segments 12 have been cut by conventional cutting means, they are deposited as noted above on the conveyor belt 11. This conveyor belt carries the segments to an inlet 18 of a mixer 19. Housing 21 of mixer 19 is an enclosed tank or reservoir for containing combined segments 12 and additive. The additive is combined with the segments 12 at the inlet 18 flow from tanks 22 and 23. Tank 22 contains a discharge 24 for introducing fat into inlet 18 of mixer 19. The discharge 24 contains a valve 26 for controlling the rate of flow of fat from the tank 22 so that a precise amount of fat may be added to the segments 12 depending on end characteristics desired in the finished simulated meat product. A serum is mixed and consists essentially all of the other previously described ingredients. The serum is stored in tank 23. From this tank 23, the serum flows through discharge 27 and is combined with the segments 12 and the fat from the tank 22. A combined fat and serum make up the additive as the term is used in this specification. (If proper emulsifiers are used, the fat can be premixed with the serum ingredients.) A valve 28 is utilized to control the quantity of serum flowing from the serum tank 23. As with the fat, a control for regulating the amount of serum introduced into combination with the segments is necessary in order to arrive at desired end characteristics in the simulated meat product. The fat and serum are essentially in a liquid form and therefore the housing 21 must be of such a nature that the liquid can be contained.

Refer now to FIGURE 2 of the drawings where the mixer 19 is shown. The mixer 19 has two agitators 29 mounted side by side in the housing 21. These agitators 29 each contain a shaft 31 with radially extending paddles 32 along the length of the shaft. Each shaft 31 is mounted at either end of the housing 21 by bearing support 30 and 33. The agitators are driven through a sprocket and chain drive which is connected to motor 34. The motor 34 drives sprocket 36 through a gear system 37. The sprocket 36 and sprocket 38, which is connected to the drive shaft 29 are interconnected by a chain 41. The sprocket 38 is connected to a gear system 39 which transmits the power from the motor 34 to both of the shafts 31 thus rotating the agitators 29. The gear systems 37 and 39 may be utilized to operate the agitators at any speed desired. Also, manipulation of the gear systems can accomplish rotation of the agitators in clockwise or counterclockwise directions depending upon the degree and kind of agitation desired for the combined segments and additive.

The mixer thoroughly and violently agitates the combined segments and additive so that the fibrous bundles or segments 12 develop an appearance similar to liquid saturated balls of cotton. This agitating action by the paddles 32 results in thoroughly impregnating the fibrous segments wtih the additive so that the resulting mass as noted previously, appears to be a rather viscous mass containing fibers. The fibers thus saturated are randomly aligned due to the intense agitation to which they have been subjected. The mixer 19 may be slightly tilted toward the discharge end 42 or the paddles 32 may be slanted so that the mass of material moves from the inlet 18 toward the outlet 42 of the mixer 19. The fibrous mass of material is discharged directly into the inlet 43 of an auger cooker generally designated by the number 44. The fibrous mass of material 46 enters the opening 43 where it encounters the flights 47 of an auger generally designated by the numeral 48.

The auger 48 is driven through a drive system by a motor 49. (See also FIGURE 1.) This motor 49 can be directly connected to the core 51 of the auger 48 as shown in FIGURE 2 or it may be connected to the auger 48 through a sprocket and gear chain system as illustrated in FIGURE 1 of the drawings. In the FIGURE 1 system, the motor 49 is connected to a shaft 52 through a sprocket 53, a chain 54 and a sprocket 56. This sprocket system is in turn driven by motor 49 through a gear reducer 57. The gear reducer permits control of the speed of the auger 48. The auger 48 is mounted within the auger housing 58 by mounting the auger 48 on a suitable bearing block 61. The auger 48 may be cantilever mounted such as that shown in the FIGURE 2 so that the discharge end 59 is not mounted on a bearing block to disrupt the flow of material along the flights 47 of the auger. If, however, the auger 48 is too large to be cantilever mounted on a bearing 61 as shown in FIGURE 2, then a bearing block and bearing may be attached to the discharge end 59 to support the auger 48. These are mere mechanical manipulations within the skill of the art.

The mass of viscous fiber material engages the flight 47 at the auger input 62 and is conveyed by rotation of the auger 48 from the input end 62 to the discharge end 59. The fibrous mass enters the auger 48 as a mass of material having the appearance of saturated fibrous cotton with random alignment of the fibers in the mass. During the movement of the fibrous mass from the input end 62 to the output end 59, the auger tends to align the fibers. This alignment apparently comes from the plug-type movement of the material as it is moved along the auger flights 47. Experience has shown that the fibrous mass tends to be transformed from a mass of randomly aligned fibers at the input end 62 to a mass having a noticeable fiber alignment at the discharge end 59.

The fibrous mass is compressed between the auger flights 47, the core 51, and the wall of the housing 58 as it moves along the length of the auger 48. This compression forces the individual fibers of the mass together thereby compacting the fibrous material removing excess air from between the fibers and enhancing its meat-like characteristics.

If the fibrous mass introduce into the opening 49 contains an additive having a heat coagulable binder such as egg albumin in a preferred embodiment, a hot water jacket 63 is placed about the auger housing 58 so that hot water or steam may be introduced through inlet 64 to contact the outer walls of the auger housing 58. (This heat unit might also be electric or the like.) This heating medium warms the walls of auger housing 58 and heats the mass between the flights 47 to a temperature sufficient to coagulate the binder. Accordingly, as the fibrous mass moves along the length of the auger 48 to the discharge end 59, the binder is coagulated at a controlled rate depending upon the temperatures applied to the auger housing 58 and is completely coagulated when the product reaches the discharge end 59. The binder coagulates and traps the ingredients of the additive throughout the fibrous mass for uniform distribution and locks these ingredients in place throughout the cross section of the resulting product. Further, the heat coagulable binder in this case binds the fibers together so that the finished product discharged from the discharge end 59 has the firm consistency of a meat product. The compression of the fibrous material during the coagulation of the binder forces the individual fibers of the mass closer together so that the binder effectively binds the individual fibers together in addition to trapping the ingredients of the additive in the overall mass of material. The resulting product discharged at 59 is a plug of material 66 which has a recognizable fiber alignment which simulates that of meat and which has a texture, physical appearance, and other characteristics of a meat product. The hot water which enters through inlet 64 is discharged through outlet 67 so that a complete circulation of heating water or steam is accomplished throughout the jacket 63. The temperature supplied to the walls were noted previously in connection with the description of the process involved. The hot water jacket 63 may have several compartments 65 so that a separate water supply at inputs 64, 70, 75 and 85 can be used to heat the wall of the housing 58. See FIGURE 1. This permits temperature control along the length of the auger. The valves 80 individually control the rate of flow of steam and/or hot water to the respective compartments. The auger core 51 may also be made hollow (see FIGURE 4) so that a heat unit 55 can be inserted. This additional heat unit permits more effective control of the temperatures within the housing 58.

Since the finished product 63 emerges as a long plug of simulated meat product, the product does not resemble the physically recognizable cuts of meat ordinarily encountered in a butcher shop. A cutter 68 is attached to the end of the auger housing 58 so that the blades 69 inserted within the cutter 68 will cut the plug of material 66 into chunks sufficiently small to be further processed. The auger flights 47 simply force the plug of material 66 against the sharp knives 69 thus severing the plug of material 66 at various points. The chunks of material are then discharged for further processing.

Ordinarily one associates a difference in texture and compactness with the different meat products. This difference in texture and firmness can often be measured in terms of compactness or toughness of the meat product. This characteristic can be achieved in part by compressing the fibrous mass to a greater degree than possible by a simple auger such as 48 where the core 51 is straight and the auger flights are uniform depth and pitch. FIGURE 6 is an alternate embodiment of an auger which has been successfully used in producing meat products which are normally considered more dense than others. Auger 71 has a core 72 which tapers from the input end 73 to the output end 74. In other words the depth of the individual flight 76 becomes less toward the output end 74 of the auger 71. A further change in auger 71 is the change in the pitch of the flight 76. The pitch is decreased toward the output end 74. This combination of decreased depth of flight and decreased pitch of the flights result in a reduced volume into which the fibrous mass is compressed with respect to the wall of the auger housing 58. The result of this reduced volume of course results in an increase in the compression applied to the fibrous mass as it moves from the input end 73 to the discharge end 74. An auger such as this has been successfully utilized for the production of red meat-type products.

Another embodiment of an auger which might be utilized in the apparatus disclosed in FIGURE 1 is the auger 77 illustrated in FIGURE 7 of the drawings. Auger 77 contains flights 78 which have a varying pitch. The core 79 of the extruder 77 is also varied in diameter so that the depth of the flight 78 varies from the input end to the output end thus producing the squeezing or compressing action achieved in the auger 71 of FIGURE 6. Auger 77, however, contains an additional section 81 connected to the output end of the auger for manipulating the fibrous plug of material at the output end 82. In the auger illustrated in FIGURES 2 and 6, the plug of material leaves the augers and forms a helix in substantially the form of a coil spring. The plug of material from such an auger moves parallel to the central axis of the coil and consequently there may be some problem in handling the material. For instance, in further processing, it may be desired to cut the finished fibrous protein product in a certain manner but to cut it along the length of the plug rather than cross section of the plug. Therefore, section 81 provides a means for aligning the plug of material so that the plug of material ultimately emerges from the auger 77 in a continuous straight stream of material. Section 81 contains a pair of channels 83 and 86 which are a continuation of the space between flights 78. These channels are essentially extensions of the helical path between flights 78. A plug of material which arrives at point 84 is separated by the extension 86 so that a portion of the plug follows channel 83 and a second portion of the plug moves along channel 86. Channels 83 and 86 gradually change direction until the channels are parallel to the central axis of the auger 77 and thus material travelling along the length of the channels 83 and 86 emerge from the auger 77 parallel to the axis thereof and travelling in a forward direction along the length of the plug. This permits cutting the plug of material across the length of the plug. More than two channels may be utilized and such an auger with three channels has been used with success.

The section 81 illustrated in FIGURE 7 shows two channels 83 and 87 which are formed from a single flight extruder. Refer now to FIGURE 8 for a similar section 88 which is an extension of a double flight extruder 89. In such an extruder 89, no point 86 is necessary to separate the plug of material leaving the auger flight. In this case two plugs of material, one in each of two separate channels 91 and 92 simply move along the longitudinal axis of the auger 88 without separating into two parts. It is to be noted at this point that a number of channels 91 which might be utilized in an end section 88 may be varied from 1 to several such channels.

Since the end channels which align the product along the central axis along the auger results in a product having the fiber alignment substantially parallel to the central axis of the core of the auger, a special problem arises. The problem is illustrated in FIGURE 10 of the drawings where the fibrous product 93 is shown in cross section. The core 94 of the auger or end section 81 such as that shown in FIGURE 7, is surrounded by a sleeve 96. This sleeve normally would be an extension of the wall of the housing 58 shown in FIGURE 2 and is stationary. Since the core 94 is rotating in the clockwise direction and the individual fibers of the product 93 are parallel to the central axis as noted of the core 94, the relative movement between the auger core 94 and the stationary housing 96 forces a few fibers 97 between the moving surfaces of the core 94 and the sleeve 96 into the space 98. This material 97 produces clogging of the working mechanisms and produces a damaged and unsanitary finished product. The damage occurs because the fibers 99 next the inside wall of the sleeve 96 tend to cling to the sleeve and are not properly carried with channel 101. This condition occurs in the end section referred to and discussed in FIGURES 7 and 8 of the drawings because of the realignment of the plug of fibrous product. Accordingly, a solution to this problem has been devised and is illustrated in FIGURES 9 and 11 of the drawings. The housing of the auger 102 contains a flange 103 at the output end. Withing this flange a sleeve 104 is fitted by a moving connection such as a bearing 106. The sleeve 104 is rigidly connected by a set screw 107 to the core 108. Thus it will be noted that as the auger 109 rotates, the end section 111 also moves but the sleeve 104 moves with the core 108 thus no fibers will slide in the space 98 illustrated in FIGURE 10 and clog the outlet end of the auger. This result is achieved because at a place where the plug is moving in a helical fashion within the housing no clogging problem occurs since the fibers engage the stationary wall along their length. The clogging only occurs when the fibers simultaneously move parallel to their own axis and engage a stationary wall while the fibers are also moving about the core of the auger in a channel 101. The effect of the mechanism in FIGURE 9 is to remove the later relative movement between the fibers and a containing wall 104. The end section illustrated in FIGURE 9 may be connected to the auger 109 by a bolt 112 as illustrated in FIGURE 9 or it may be an integral part of the auger as illustrated in FIGURE 7 of the drawings.

The invention will be more thoroughly understood from reference to the following examples of simulated meat products which can be produced. The percentages listed are by weight.

EXAMPLE I

To produce a hamburger or beef 1.2 pounds of additive consisting of a serum and a fat were prepared for each 1 pound of fibrous protein material to be treated.

The fat which constitutes about .2 pound of the additive may be either an animal fat or a vegetable fat or a combination thereof depending on the finished flavor desired, the marketing objectives and so forth. Preferably a vegetable shortening is used as in this example. The serum was prepared from the following ingredients by conventional mixing methods and contained the following percentage of the ingredients based on the weight of the serum.

| | |
|---|---:|
| Water | 51.0 |
| Egg white | 15.0 |
| Wheat gluten | 10.0 |
| Soy flour | 8.0 |
| Onion | 7.0 |
| Sugar | 5.0 |
| Hydrolyzed protein | 2.0 |
| Salt | 1.0 |
| Monosodium glutamate | 0.5 |
| Artificial color | 0.5 |
| | 100.0 |

The serum and fat were then combined with a quantity of fibrous protein material having randomly aligned fibers. This protein may be made from vegetable sources such as corn or soy bean. Preferably soy bean protein is used as was the case in this example. The combined fat, fibrous material and serum were intensely agitated to thoroughly impregnate the fibrous material with the serum and fat. Next the impregnated mass of fibrous material was worked to align the individual fibers to simulate the fiber alignment of beef. While the fiber alignment was being accomplished, the product was compressed to compact the fibers and insure that the binder (egg albumin designated as egg white) interconnects the individual fibers. Since a heat coagulable binder is used, heat was applied to coagulate the egg white thus locking the various ingredients of the additive throughout the fibrous material and also to firmly connect the fibrous. The temperature range was from about 125° F. to about 220° F. The resulting product had the taste, color, texture and other desirable characteristics of beef. This simulated beef was then ground to the consistency of hamburger and then dried so that it could be stored with little or no loss of quality. Beef chunks could also have been made by cutting rather than grinding the finished product.

EXAMPLE II

A simulated ham product was produced by essentially the same methods as those described in Example I. Certain minor differences occur however due to the difference in the end products. The serum in the production of ham contained the following percentage of ingredients based on the weight of the serum.

| | |
|---|---:|
| Water | 40.0 |
| Egg white | 20.0 |
| Sugar | 18.0 |
| Salt | 10.0 |
| Seasonings | 8.0 |
| Hydrolyzed vegetable protein | 3.6 |
| Artificial color | 0.4 |
| | 100.0 |

0.6 pound of additive was used for each 1 pound of fibrous protein material with the serum constituting .5 pound of the additive on the remainder was vegetable shortening. The finished simulated ham was not ground and dried but this is a matter of choice depending on the end use of the simulated ham.

EXAMPLE III

Simulated "chicken" or "seafood" was prepared by the method set forth in Example I and II with certain minor variations. The additive was added to the fibrous protein product on the basis of .7 pound of additive per 1 pound of fibrous product. The fat, a vegetable oil, constituted .2 pound of the additive, the remainder being serum which contained the following ingredients by percentage based on the weight of the serum.

| | |
|---|---:|
| Water | 60.0 |
| Egg white | 24.0 |
| Seasonings | 7.0 |
| Sugar | 4.0 |
| Salt | 4.0 |
| Monosodium glutamate | 0.6 |
| Artificial flavorings | 0.4 |
| | 100.0 |

The finished simulated meat product was dried. As noted previously, the product may be ground or otherwise processed and dried as desired depending upon the end of the simulated meat product.

It is to be understood that the examples, embodiments and variations are merely illustrative of the invention and numerous modifications will occur to those skilled in the art which fall within the scope of the invention.

Now therefore we claim:

1. A process of preparing a protein food product resembling meat from fibrous soy bean protein material comprising the steps of cutting bundles of fibers from a tow of fibers combining a quantity of the cut fibrous material with an additive including a binder agitating the combined fibrous material and additive to separate the individual fibers and to induce thorough mixing of the fibrous material and additive, moving the fibrous material in plug form along a confined passage to induce alignment of the individual fibers to substantially simulate the fiber alignment of meat, and simultaneously progressively compressing the fibrous material between relatively moving mechanical surfaces to form a plug of protein food product which substantially duplicates the density of meat.

2. A process according to claim 1 in which said binder is a heat setting binder and which further includes the step of applying sufficient heat to the fibrous material to set the binder while the fibrous material is moving along the confined passage.

3. A process according to claim 1 in which said binder is an egg albumen binder and which further includes the step of heating said fibrous material and additive to a temperature from about 125° F. to about 220° F. as it is being moved and compressed in the passage to set the egg albumen.

4. A process according to claim 1 which further includes the steps of cutting the fibrous material to resemble the meat product being simulated and then drying the cut fibrous material.

5. A process according to claim 4 in which the fibrous product is ground to resemble hamburger and then dried to a moisture content from about 2% to about 8% moisture by weight.

6. A process according to claim 4 in which the fibrous product is diced to resemble a meat product and then dried to a moisture content from about 2% to about 8% moisture by weight.

7. An apparatus for preparing a product resembling meat from a fibrous soy bean protein material which comprises an agitator, means for continuously introducing a quantity of fibrous material into said agitator, means for continuously introducing an additive into said agitator for mixture with said fibrous material, a cylindrical auger housing connected to said agitator opposite an outlet end of said housing, an auger within said housing for moving said material in a helical path formed by the walls of said housing and the flights of said auger to align the individual fibers of the fibrous material, means associated with the outlet end of said auger having at least one forming path which is a continuation of the helical path and which takes a direction parallel to the axis of rotation of said auger for forming the fibrous material into a continuous tow having a predetermined cross sectional shape, said auger having a tapered core for compressing the fibrous material, and means associated with the wall of said housing for heating said fibrous material as it is moved along said helical path.

8. An apparatus in accordance with claim 7 which further includes a cutter associated with the outlet end of said housing for cutting the material as it emerges from said auger.

9. An apparatus in accordance with claim 7 in which the flights of said auger have a progressive reduction of pitch toward said outlet end to compress the fibrous material.

References Cited

UNITED STATES PATENTS

| | | | |
|---|---|---|---|
| 3,104,975 | 9/1963 | Bowman | 99—81 |
| 3,117,006 | 1/1963 | Wenger | 99—80 |
| 3,210,195 | 10/1965 | Kielson et al. | 99—14 |
| 3,246,594 | 4/1966 | Fisher | 99—82 |
| 3,343,963 | 9/1967 | Kielson | 99—14 |
| 3,269,841 | 8/1966 | Dechaine et al. | 99—14 |

MAURICE W. GREENSTEIN, Primary Examiner

H. H. KLARE III, Assistant Examiner

U.S. Cl. X.R.

99—14, 235; 107—14